United States Patent Office 3,439,563
Patented Apr. 22, 1969

3,439,563
TRANSMISSION SYSTEM FOR INTERCONNECTING TWO ROTARY MACHINES
John William Ledward Petty, Wokingham, England, assignor to National Research Development Corporation, London, England, a British corporation
Filed Oct. 10, 1966, Ser. No. 585,410
Claims priority, application Great Britain, Oct. 14, 1965, 43,620/65
Int. Cl. F16h 5/60
U.S. Cl. 74—810                                9 Claims

ABSTRACT OF THE DISCLOSURE

A rolling friction steplessly variable ratio unit and a planetary gear train are used to couple together an engine and a generator. The generator, externally energized, can start the engine in a power recirculation mode when the input and output of the variable unit are respectively connected through a first sprag to two elements of the gear train, the engine being connected to the third. One ratio of the variable unit cancels the ratio of the gear train so that the generator can run up to synchronous speed unloaded. When the engine starts and reaches a certain speed the gear train over-runs the first sprag and a second sprag, formerly over-running, comes into action to couple the engine directly through the variable unit to the generator, the gear train being then locked up to rotate bodily.

---

This invention relates to a transmission unit for interconnecting two rotary machines at least one of which is capable of operating either as a generator when rotated by the other or as a motor to drive the other when energised from an external source.

The invention is particularly, but not exclusively, adapted to the interconnection of an electric generator and an engine of the type which has to be rotated to start it.

It has long been known to drive an alternator, required for auxiliary services for which a constant frequency is essential, by coupling it to an engine the speed of which varies in service, through a variable ratio transmission unit the ratio of which is capable of variation to ensure that the alternator rotates at a chosen constant speed despite variation in the speed of the engine. Aircraft alternators supplying electric current inter alia for electronic devices are commonly driven from the flight engines in this way, through variable ratio transmission units of the hydrostatic type.

It has also long been known to use an engine-driven electric generator, the normal function of which is to supply current for auxiliary equipment, to turn the engine to start it from rest. This system has been confined to direct current generators normally charging secondary batteries in parallel with the said auxiliary services, the battery supplying current to the generator so that it acts as a motor to start the engine.

A fixed ratio coupling has been used for interconnecting the generator and the engine since a constant generator speed is not essential in a direct current system and it is possible to design a d.c. generator with a reasonably satisfactory low-speed torque when acting as a motor to enable the engine to be moved from rest through a fixed ratio coupling.

It is not however known to use an alternator to start the engine, in either of the above contexts. One of the difficulties encountered arises from the popularity of alternators of the induction type for generating current for auxiliary services. This type of alternator, when acting as a motor energised from an external alternating current supply of constant frequency, has an extremely poor torque characteristic at speeds below the synchronous speed, and it is necessary to be able to provide a zero step-up ratio in the coupling to the engine so that the alternator may be run up to synchronous speed without turning the engine and then to vary this ratio steplessly in the direction of positive step up ratios so that the engine is progressively accelerated.

There are advantages, in coupling an alternator to an engine in using a variable ratio transmission unit of limited ratio range not including zero in either direction of torque transmission since this enables a variable unit of the so-called rolling friction type to be employed, such units being capable of uniformly high efficiency over their whole ratio range and being relatively silent and inexpensive, as compared with most hydrostatic units of comparable load capacity.

Special measures are required however to provide the required zero step up ratio when the alternator is externally energised and is acting as a motor and it is the object of the invention to solve this and other problems. Although the context of the invention has been illustrated in relation to electric alternating current generator/motors, driven by or driving internal combustion engines, it will be appreciated that it is equally applicable to other contexts where analogous problems arise, for instance the generator may be a hydraulic machine having a poor torque characteristic at low speed, or the engine may be a synchronous motor with a low "stalled torque" characteristic which is required to start from rest under load.

According to the invention therefore there is provided apparatus for interconnecting two rotary machines at least a first one of which is capable of operating as a generator when rotated by the second machine or as a motor to drive the second machine when energised from an external source, the apparatus comprising a transmission unit having a first shaft and a second shaft interchangeably acting respectively as the input shaft and the output shaft the ratio between which is continuously variable over a finite range of ratios without change in the direction of relative rotation between the said shafts, a three element gear train having a first element coupled to rotate with the second shaft of the transmission unit a second element adapted for coupling to the second machine and a third element coupled through first clutch means to the first shaft of the transmission unit such first shaft being adapted for coupling to the first machine, second clutch means adapted to couple together the first and second elements of the gear train to prevent at least one predetermined direction of relative rotation between such elements, the first clutch means being adapted to prevent at least one predetermined direction of relative rotation between the third element of the gear train and the first shaft of the transmission unit the ratio range of the transmission unit including a ratio (hereinafter called the "neutral ratio") which is the inverse of the ratio between the first and third elements of the gear train whereby rotation by the first machine, of the first shaft of the transmission unit does not cause rotation of the second element of the gear train when the transmission unit is adjusted to the neutral ratio.

According to the invention there is further provided apparatus for interconnecting an electric alternator, which is capable of giving mechanical power as a motor when energised from an external electric current source, and an engine, the apparatus being adapted for operation in either of two regimes, namely a first regime in which the alternator, externally energised, acts as a motor to drive the engine to start the same, and a second regime in which the engine, turning under its own power drives the alternator to cause it to deliver electric current, the apparatus comprising a transmission unit of the rolling friction type capable of varying the ratio between a first shaft and a second shaft, over a predetermined range of ratios not including zero without a change of the direction of rotation of either of the shafts, and a three element planetary gear train having a first element and a third element connected respectively to the second and first shafts of the transmission unit and a second element adapted for connection to the engine the first shaft being adapted for connection to the alternator, the arrangement being such that in the first regime the alternator, acting as a motor drives the engine through the gear train in a recirculating arrangement when the transmission unit is set to a ratio other than a neutral ratio equal to the inverse of the ratio between the third and first elements of the gear train, whilst in the second regime the engine drives the alternator, clutch means operating to lock together the elements of the gear train, and clutch means operating to disconnect the third element of the gear train from the first shaft of the transmission unit.

In the preferred arrangement unidirectional clutches are used for the clutch means.

Means are provided for adjusting the ratio of the transmission unit which operate under a first regime to change the ratio from the neutral ratio in the direction away from the end of the ratio range of the transmission unit which is close to the neutral ratio, whereby the first machine, operating as a motor drives the second machine at a speed which, as the ratio of the transmission unit is so changed is increased from zero to a limiting speed which is a function of the speed of the first machine, or under a second regime which permits the second machine to drive the first machine when the former is delivering power and rotating in the same direction as it rotates during the first regime but at a speed above the limiting speed. In the first regime the torque path includes the planetary gear train and the first unidirectional clutch, with the second unidirectional clutch idling. In the second regime the torque path includes the second unidirectional clutch, with the first unidirectional clutch idling and the planetary gear train rotating bodily and transmitting no torque so that transmission of torque from the said other rotary machine to the said one rotary machine takes place through the transmission unit directly, without the intervention of the gear train.

A preferred form of the invention is adapted for interconnecting an internal combustion turbine engine and an electric generator which is capable of acting as a motor when supplied with electric current from an external source. In the first regime the generator acts as a "self starter" to turn the engine. In the second regime, the generator, disconnected from the external source of current, is driven by the engine. This system is particularly adapted for use in aircraft where the generator is required to provide electric current for lighting and auxiliary equipment of the aircraft and is required to be maintained at a constant speed when the engine is running at any speed between ground idling speed and maximum speed. It is particularly desirable that the engine should be capable of being started without the application of mechanical power from an external source and it is a great convenience if the generator can be used for the purpose.

An embodiment of the invention in this context is described below in relation to the accompanying drawings in which FIGURE 1 is a schematic representation of the general arrangement of the said embodiment showing the mode of attachment to the first machine and the second machine.

Figure 1:
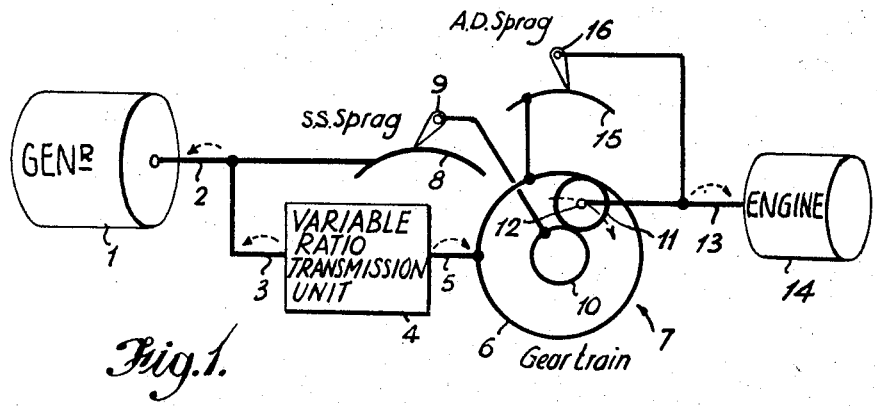
Figure 2:
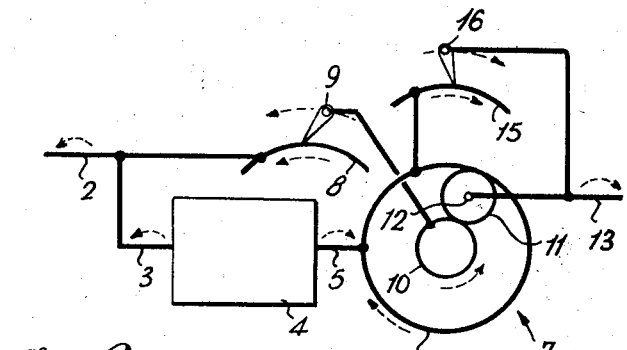
FIGURE 2 is a schematic representation of said embodiment operating in the first regime.
Figure 3:
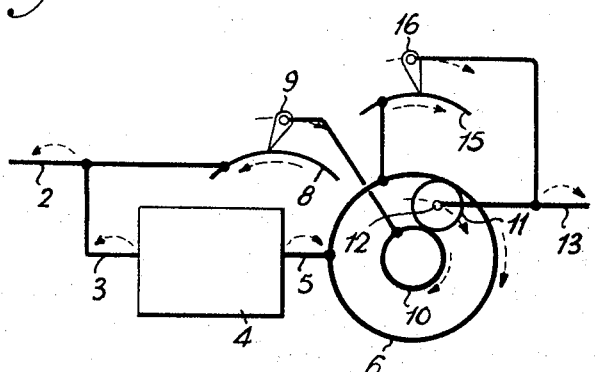
FIGURE 3 is a schematic representation of the said embodiment operating in the second regime and FIGURE 4 is a diagrammatic representation of the actual mechanism of the said embodiment.

FIGURES 1, 2 and 3 make use of the following connections:

A planetary gear train is indicated by two concentric circles representing the sun and annulus respectively of an epicyclic gear train, a third circle, between and tangent to the first two circles, represents a planet pinion the centre of this circle being marked with a dot which represents the planet carrier. Shaft connections to the sun and annulus are shown as lines terminating in dots on the circumferences of the first two circles and to the carrier as a line terminating in the dot in the centre of the third circle.

An unidirectional clutch is represented as a segment of a pawl and ratchet wheel device the latter being shown as a part of a circle to which shaft connections are indicated in the same way as in the case of the circles representing the gear train, the former being shown as a wedge slanted to indicate the direction in which the clutch drives and connections to the second element of the cluch are shown as lines terminating in a dot in the thick end of the wedge. Directions of rotation are shown by curved arrows.

FIGURE 1 shows only those directions of rotation which are constant throughout.

FIGURE 2 shows the directions of rotation of various elements of the transmission system in the first regime.

FIGURE 3 shows the directions of various elements of the transmission system in the second regime.

In FIGURE 1, a generator 1 has its rotor shaft 2 coupled to the input shaft 3 of a steplessly variable ratio transmission unit 4 the output shaft 5 being coupled to the annulus 6 of a planetary gear train 7. The transmission unit is capable of a ratio range extending from 2.2:1 step down to 1.5:1 step-up from shaft 3 to shaft 5 and the annulus: sun ratio of gear train 7 is 2:1.

Shaft 3 is also connected to one element 8 of a unidirectional clutch of which the other element 9 is represented as a pawl. This clutch will be hereafter referred to as the "Self-Start Sprag." Pawl 9 is coupled to sun wheel 10 of gear train 7. The other element of the gear train 7 is a planet wheel 11 mounted on a planet carrier represented by a dot 12 in the centre of wheel 11.

Planet carrier 12 is coupled to the shaft 13 of the engine 14.

Another unidirectional clutch having elements 15, 16 corresponding to elements 8 and 9 of the self-start sprag, is bridged across annulus 6 and carrier 12. This clutch will hereafter be referred to as the "Alternator Drive Sprag."

The generator and the Engine each rotate in one direction only; anti clockwise for the generator; clockwise for the Engine.

Turning to FIGURE 2, which represents the first regime, it will be appreciated that the conditions for no torque at the carrier 12 are that the shaft 5 of transmission unit 4 (and annulus 6) should be rotating slower than the input shaft 3 of the transmission by a factor equal to the E ratio of the gear train. When the two parts of the self-start sprag 8/9 will be rotating at the same speed but unloaded. If the step-down ratio of the transmission unit is greater than the E ratio of the gear train the annulus 6, rotating clockwise, will drive the sun wheel 10 (through pinion 11 with carrier 12 stationary) at a speed (anticlockwise) which causes pawl 9 of the self-start sprag 8 and 9 to lag behind element 8 so that no reverse torque can be applied to carrier 12, as would obtain if sprag 8/9 were to be replaced by a permanent connection.

It is envisaged that generator 1 will be an induction alternator normally required to produce alternating current at a closely controlled constant frequency and, when used as a motor would require to be energised from an external A.C. power supply of the same frequency. The stalled torque of such a motor would be relatively low and it would be required that it could be run up to synchronous speed under no load.

To achieve this it is only necessary to provide, in the transmission unit, a ratio range which at one extreme, provides a step-down ratio (left to right in FIGURE 1) a little greater than the E ratio of gear train 7, and to control the transmission unit to this extreme end of the ratio range whilst the alternator 1 runs up to synchronous speed. The need to control the transmission unit step-down ratio to precise equality with the gear train E ratio, is thus avoided by means of the self-start sprag 8/9.

As the transmission unit step-down ratio is moved to equality with the gear train E ratio, there is still no torque transmitted to the carrier 12 but when it is further changed in the same direction sun wheel 10 and sprag element 9 tend to gain on sprag element 8 and the sprag 8/9 engages to hold sun wheel 10 to the speed of shaft 3, that is to the input of the transmission unit. Any further change of the transmission unit ratio tending to increase the speed of shaft 3 applies clockwise torque to carrier 12 to turn the engine, sun wheel 10 acting as a reaction member turning anti-clockwise at a speed which cannot exceed the speed of shaft 3 because of sprag 8/9.

The transmission unit 4 may have a limiting step-up ratio (left to right in the drawing) of about 1.5:1 and at this ratio the engine 14 will rotate at about ⅔ of the speed of alternator 1. If the synchronous speed of the alternator is 8000 r.p.m. the engine can be rotated up to a maximum speed of 5333 r.p.m., which is sufficient for starting the majority of I.C. turbine engines.

When the engine starts it will speed up beyond this speed the result of which will be first to slow down the anticlockwise rotation of the sun wheel 10 so that sprag 8/9 is no longer engaged. There is thus virtually no connection between the alternator and the engine unless the engine is accelerated to 1.5 times the alternator speed, the condition necessary for the carrier 12 to be rotating at the same speed as the annulus 6 so that the alternator drive sprag 15/16 may start to engage.

This will not normally be possible because it is intended that the engine can never drive the alternator at a speed above the controlled constant speed, at any speed within the working range of the engine and if this is to be ensured, there must alwaays be a small amount of the ratio range of the transmission unit unused at full engine speed so that there shall be enough available step-down (this time considered as from right to left in the drawings) to prevent the alternator being over speeded.

Should the engine start before the transmission unit ratio has reached the limiting left-to-right step-up ratio it may be arranged for the ratio control to cease raising the ratio, or the ratio may be allowed to change to the end of the range but to the extent which the engine is wholly driving itself the transmission system will be unloaded.

Suppose now that the external current supply is cut off from the alternator with the engine turning at say 6600 r.p.m. If the ratio of transmission unit 4 remained unchanged the alternator speed would fall to 1/1.5 of the engine speed with carrier 12 and annulus 6 rotating at the same speed and sprag 15/16 just engaged.

If now a ratio control system for transmission unit 4, designed to hold the alternator speed constant at 8000 r.p.m., is now put into operation, the ratio will be changed to 8000/6600 step-up (from right to left in the drawing) i.e. 1.23:1 (equivalent to 1.23:1 step down when viewed from left to right). There is however up to 2.2:1 step-up available in the transmission unit so that the required constant alternator speed could be maintained at engine speeds down to 8000/2.2=3636 r.p.m.

If the constant alternator speed ratio control system is energised on cutting off the external current supply to the alternator, by a relay for instance, the alternator speed will fall only slightly before the ratio of the transmission unit is changed to restore it to the prescribed constant speed.

The energisation of the constant alternator speed ratio control system maintains the second regime of the transmission system in action.

There is a gap between the two regimes when the engine is rotating under its own power at speeds above ⅔ of the prescribed constant alternator speed (but below 1.5 times the latter speed) and there is thus no problem of timing the operations necessary for inaugurating the second regime.

When the ratio of the transmission unit has been adjusted to produce, in the second regime, the prescribed constant alternator speed, the alternator drive sprag 15/16 holds the speed of annulus 6 to that of carrier 12 and therefore the whole gear train rotates as one at engine speed and in the clockwise direction. Self-start sprag elements 8 and 9 are thus rotating in opposite directions in the slipping sense of the sprag.

When the engine is cut back, after running at ground-idling speed which may have required a slight step-up in the transmission unit 4 to hold the alternator at the prescribed constant speed, the control system will change the ratio to keep the alternator up to this speed until, at the extreme ratio limit (2.2:1) the engine is no longer turning fast enough to maintain this alternator speed. The alternator speed will then fall with engine speed and eventually stop when the engine stops.

The variable unit will thus reach the 2.2:1 step-down ratio (in the alternator-to-engine direction) as the system comes to rest on the stopping of the engine and this is the ratio required for restarting the engine.

It is necessary to disable the constant alternator speed control system before attempting to energise the alternator so that it acts as a motor to start he engine. This can conveniently be brought about on application of an externally generated electric current to the alternator (by a relay for instance).

When the variable unit is of the toroidal race rolling friction type having at least one roller engaging and providing a driving connection between facing toroidal surfaces of a driving and a driven disc mounted for rotation about a common main axis it is possible to control the torque applied from the motoring alternator to the engine in a very simple manner.

Commonly this type of variable unit changes ratio by displacement of the roller axes from the stable ratio equilibrium condition in which they intersect the main axis, the torque reaction at the rollers tending to bring about such a displacement and the roller positioning mechanism exerts a force tending to resist such displacement.

The geometry is such that the torque reaction at the rollers tends to displace them from the said equilibrium condition in a direction such that the rollers steer themselves to different ratio attitudes the direction of such difference being such as to reduce the ratio, output velocity/input velocity, of the transmission unit. Conversely the force exerted by the roller positioning mechanism tends to increase the said ratio.

The torque reaction at the rollers is proportional to the sum of the input torque and the output torque of he variable unit and, in terms of either one of such torques, is a function of ratio. It is a simple matter to programme the roller-positioning force to match the torque available from the motoring alternator to the drag torque of the engine at various speeds.

If the alternator, when energised from an external source of current, has a slip factor which is sensitive to load torque it is feasible to use the constant alternator speed control system for regulating the ratio of the variable unit in the engine starting regime bearing in mind that the sense of the roller positioning force must be the opposite of that obtaining in the regime in which the engine drives the alternator.

Figure 4:
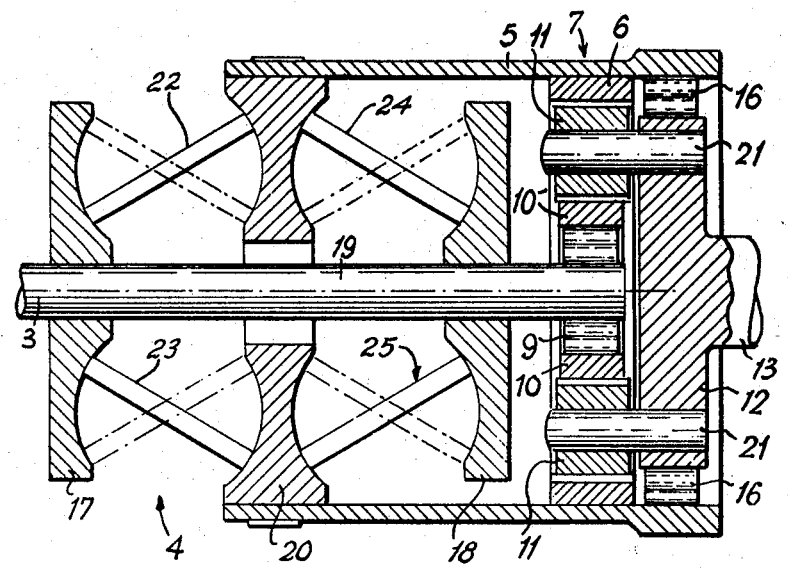

In FIGURE 4, in which the same numerals as those used in FIGURES 1, 2, and 3 are used to denote corresponding items, the transmission unit is of the rolling friction type having two discs 17 and 18 having toroidal surfaces on the inwardly facing sides. Discs 17 and 18 are fast with a main central shaft 19 which performs the functions of shaft 3. A middle disc 20, mounted on bearings (not shown) has toroidal surfaces on both sides. Two sets of rollers 22, 23 and 24, 25, provide driving connections respectively between disc 17 and the left hand side of disc 20 and between disc 18 and the right hand side of disc 20. The rollers may be tilted in the manner indicated by dotted lines to vary the ratio of the transmission unit. The drive is taken from disc 20 by means of a sleeve which acts as shaft 5 and is so referenced. To the right of the transmission unit the gear train 7 comprises an internally toothed annulus 6 with which are meshed planet pinions 11 carried on pins 21 mounted in planet carrier 12, which is integral with shaft 13. Planet pinions 11 are meshed with a central sun wheel 10 which is bored out centrally leaving an annular space between this bore and shaft 19 in which are accommodated the gripping members 9 of the self-start sprag.

These elements are of "figure-of-eight" section, held in a cage (not shown) and they are oriented at a slant to the radial plane containing the main axis. This is a well known type of sprag and requires no further description.

The sleeve 5 is extended to the right beyond the gear train 7 to surround the outer edge of the planet carrier 12 from which it is spaced by an annular gap in which there are accommodated the gripping members 16 of the alternator drive sprag. These gripping members are also of the "figure-of-eight" type.

The details of the transmission unit 4 are not described as this type of transmission unit is well known. It must however be such that the direction of torque reaction at the rollers may be reversed and if it is of the type such as that described in U.K. Patent application No. 17,606/60 for instance, where the roller torque reaction is conveyed to the member by which ratio changes are made, this member must be operated by an actuator capable of applying force to the member in either direction since, in the first regime the roller torque reaction is anti-clockwise whereas in the second regime, the roller torque is clockwise, for the directions of rotation indicated in FIGURES 1, 2 and 3.

I claim:

1. Apparatus for interconnecting two rotary machines at least a first one of which is capable of operating as a generator when rotated by the second machine or as a motor to drive the second machine when energised from an external source, the apparatus comprising a transmission unit having a first shaft and a second shaft interchangeably acting respectively as the input shaft and the output shaft, means for continuously varying the ratio between the shafts over a finite range of ratios without change in the direction of relative rotation between the said shafts, a three element gear train having a first element coupled to rotate with the second shaft of the transmission unit a second element adapted for coupling to the second machine and a third element coupled through first clutch means to the first shaft of the transmission unit, such first shaft being adapted for coupling to the first machine, second clutch means adapted to couple together the first and second elements of the gear train to prevent at least one predetermined direction of relative rotation between such elements, the first clutch means being adapted to prevent at least one predetermined direction of relative rotation between the third element of the gear train and the first shaft of the transmission unit, the said means for varying the ratio of the transmission unit including means for selecting a certain ratio (hereinafter called the "neutral ratio") which is the inverse of the ratio between the first and third elements of the gear train whereby rotation by the first machine, of the first shaft of the transmission unit does not cause rotation of the second element of the gear train when the transmission unit is adjusted to the said neutral ratio.

2. Apparatus as claimed in claim 1 in which the neutral ratio is near to one end of the ratio range of the transmission unit and the first clutch means is a unidirectional device of the so called "free wheel" or "sprag" type poled to connect together the first shaft of the transmission unit and the third element of the gear train when the ratio of the transmission unit is varied from the neutral ratio towards the other end of the said ratio range, provided that the second element of the gear train is supplying torque to the second machine.

3. Apparatus as claimed in claim 1 in which the first clutch means interconnects the third element of the gear train and the first shaft of the transmission unit when the latter is driven in a predetermined direction by the first machine and when the direction and speed of rotation of the third element of the gear train is such as to apply torque to the first shaft in the direction tending to increase the speed of the first shaft in the predetermined direction, the first clutch means being inoperative to connect the third element of the gear train to the first shaft of the transmission unit when the former lags behind, or rotates in the opposite direction to, the latter.

4. Apparatus as claimed in claim 1 in which, when torque is applied to the second element of the gear train by the second mechine causing the said second element to rotate in a second predetermined direction at a speed tending to exceed the speed in the same direction of the first element of the gear train, the second clutch means operates to connect the said first and second elements together whereby the three elements of the gear train are effectively locked together and whereby the first shaft is caused to rotate in the first predetermined direction through the transmission unit with the first clutch means disconnected.

5. Apparatus as claimed in claim 1 in which the transmission unit is of the type in which the first and second shafts rotate in opposite directions, namely a first direction and a second direction and in which the gear train is of the epicyclic type the first element being an annulus the second element a planet carrier and the third element a sun wheel the tooth ratio between the sun wheel and the annulus (i.e. the value or "E" ratio of the gear train), being such that the inverse of that ratio lies within the ratio range of the transmission unit being the neutral ratio of the transmission unit whereby, when the first shaft is rotated in a first predetermined direction by the first machine no rotation of the planet carrier takes place as a result of the rotation of the said first shaft when the transmission unit is in the neutral ratio.

6. Apparatus as claimed in claim 5 in which the first clutch means is a unidirectional device of the so-called "free wheel" or "sprag" type, poled so as to engage only in the direction in which the sun wheel transmits torque to the first shaft in the first predetermined direction.

7. Apparatue as claimed in claim 5 in which, when the ratio of the transmission unit is varied from the neutral ratio in the sense such as to increase the velocity of the second shaft in the second direction for a given velocity in the first direction of the first shaft, the carrier is driven in the second direction by the annulus, the sun acting as a reaction member of the gear train so as to apply torque in the first direction, through the first clutch means to the first shaft.

8. Apparatus as claimed in claim 7 in which, when the planet carrier is rotated in the second direction by the second machine beyond a first predetermined speed, torque ceases to be applied to the first shaft through the first clutch means by the sun wheel and when the planet carrier is rotated faster to a second predetermined speed, the speeds of the planet carrier and the annulus become equal so that the second clutch means engages to lock the elements of the gear train together whereby torque is transmitted from the carrier through the transmission unit to the first shaft tending to rotate it in the first direction at a speed dependent on the ratio for the time being of the transmission unit provided that the first shaft is not being rotated at a higher speed by the first machine.

9. Apparatus for interconnecting an electric alternator, which is capable of giving mechanical power as a motor when energized from an external electric current source, and an engine, the apparatus being adapted for operation in either of two regimes, namely a first regime in which the alternator, externally energized, acts as a motor to drive the engine to start the same, and a second regime in which the engine, turning under its own power drives the alternator to cause it to deliver electric current, the apparatus comprising a transmission unit of the rolling friction type including means for varying the ratio between a first shaft and a second shaft over a predetermined range of ratios not including zero without a change of the direction of rotation of either of the shafts, and a three element planetary gear train having a first element and a third element connected respectively to the second and first shafts of the transmission unit and a second element adapted for connection to the engine the first shaft being adapted for connection to the alternator, the arrangement being such that in the first regime the alternator, acting as a motor drives the engine through the gear train in a recirculating arrangement when the transmission unit is set to a ratio other than a neutral ratio which is defined as that ratio equal to the inverse of the ratio between the third and first elements of the gear train, whilst in the second regime the engine drives the alternator, clutch means for locking together the elements of the gear train, and further clutch means for disconnecting the third element of the gear train from the first shaft of the transmission unit.

References Cited

UNITED STATES PATENTS

| | | | |
|---|---|---|---|
| 2,908,189 | 10/1959 | Parker et al. | 74—810 |
| 2,941,422 | 6/1960 | Barish | 74—796 |
| 3,270,207 | 8/1966 | Stockton | 74—810 |

FOREIGN PATENTS

| | | |
|---|---|---|
| 937,469 | 9/1963 | Great Britain. |

ARTHUR T. McKEON, *Primary Examiner.*

U. S. Cl. X.R.

74—200, 796